United States Patent
Madrahalli et al.

(10) Patent No.: US 8,457,001 B2
(45) Date of Patent: Jun. 4, 2013

(54) MESH RESTORATION IN OPTICAL TRANSPORT NETWORKS

(75) Inventors: Vagish Madrahalli, Woodstock, GA (US); Bhavesh Nisar, Alpharetta, GA (US); Richard Conklin, Cumming, GA (US)

(73) Assignee: Ciena Corporation, Hanover, MD (US)

( * ) Notice: Subject to any disclaimer, the term of this patent is extended or adjusted under 35 U.S.C. 154(b) by 502 days.

(21) Appl. No.: 12/766,341

(22) Filed: Apr. 23, 2010

(65) Prior Publication Data

US 2011/0262128 A1    Oct. 27, 2011

(51) Int. Cl.
*H04Q 2011/0088* (2006.01)
*H04J 14/0267* (2006.01)

(52) U.S. Cl.
USPC ............................................. 370/242; 398/45

(58) Field of Classification Search
CPC ....................... H04Q 2011/0088; H04J 14/0267
USPC ............................................. 370/242; 398/45
See application file for complete search history.

(56) References Cited

U.S. PATENT DOCUMENTS

| | | | |
|---|---|---|---|
| 2004/0095946 A1* | 5/2004 | Baker | 370/405 |
| 2009/0208206 A1* | 8/2009 | Madrahalli et al. | 398/45 |
| 2010/0054731 A1* | 3/2010 | Oltman et al. | 398/1 |

* cited by examiner

*Primary Examiner* — Kibrom T Hailu
*Assistant Examiner* — Benjamin Lamont
(74) *Attorney, Agent, or Firm* — Clements Bernard PLLC; Christopher L. Bernard; Lawrence A. Baratta, Jr.

(57) ABSTRACT

The present disclosure provides mesh restoration systems and methods with Optical Transport Network (OTN) links using a signaling and routing protocol, such as Optical Signaling and Routing Protocol (OSRP), Automatically Switched Optical Network (ASON), Generalized Multi Protocol Label Switching (GMPLS), and the like. The present invention includes an optical node, network, and method using the signaling and routing protocol for OTN lines of differing bandwidth granularities. The present invention utilizes OTN overhead for in-band signaling and may include capability for supporting SONET/SDH lines as well as OTN lines in the same system using the signaling and routing protocol.

20 Claims, 10 Drawing Sheets

| | | | | | | | |
|---|---|---|---|---|---|---|---|
| | IE identifier | | | | | | |
| 0 | 1 | 0 | 1 | 1 | 0 | 1 | 0 |

| 1 ext | Coding Standard | colspan="6" | IE Instruction Field |
|---|---|---|---|
| | Length of Connection Identifier contents |
| | Length of Connection Identifier contents (continued) |
| 1 ext | 0 spare | 0 spare | 0 spare | 0 spare | Facility associated signaling |
| | Facility Number (Note 1) |
| | Facility Number cont'd |
| 1 ext | colspan="4" | Forward Id Size | Forward Id Coding Type |
| | Forward Connection Id<br>Ch Max  Ch Max-1  Ch Max-2  Ch Max-3  Ch Max-4  Ch Max-5  Ch Max-6  Ch Max-7 |
| | Forward Connection Id (continued) |
| | Forward Connection Id (continued) |
| | Forward Connection Id (continued) |
| | ... |
| | Forward Connection Id (continued) |
| 1 ext | colspan="4" | Backward Id Size | Backward Id Coding Type |
| | Backward Connection Id<br>Ch Max  Ch Max-1  Ch Max-2  Ch Max-3  Ch Max-4  Ch Max-5  Ch Max-6  Ch Max-7 |
| | Backward Connection Id (continued) |
| | Backward Connection Id (continued) |
| | Backward Connection Id (continued) |
| | ... |
| | Backward Connection Id (continued) |

MESH RESTORATION IN OPTICAL TRANSPORT NETWORKS

FIELD OF THE INVENTION

The present invention relates generally to optical networking. More particularly, the present invention relates to mesh restoration systems and methods with Optical Transport Network (OTN) links using a signaling and routing protocol.

BACKGROUND OF THE INVENTION

ITU-T defines Optical Transport Network (OTN) as a set of Optical Network Elements connected by optical fiber links, able to provide functionality of transport, multiplexing, routing, management, supervision and survivability of optical channels carrying client signals. Of note, OTN is defined in: ITU-T G.709 "Interfaces for the optical transport network (OTN)"; ITU-T G.798 "Characteristics of optical transport network hierarchy equipment functional blocks"; OTN Standard FEC (Called GFEC sometimes) is defined in ITU-T G.975; OTN Jitter is defined in ITU-T G.8251 "The control of jitter and wander within the optical transport network (OTN) "; ITU-T G.870 "Terms and definitions for Optical Transport Networks (OTN)"; ITU-T G.871 "Framework for optical transport network Recommendations"; ITU-T G.873.1 "Optical Transport Network (OTN): Linear protection"; ITU-T G.874 "Management aspects of the optical transport network element"; ITU-T G.874.1 "Optical transport network (OTN): Protocol-neutral management information model for the network element view"; ITU-T G.959.1 "Optical transport network physical layer interfaces"; ITU-T G.8201 "Error performance parameters and objectives for multi-operator international paths within the Optical Transport Network (OTN)"; and the like. Conventionally, mesh restoration in optical networks is limited to SONET/SDH traffic or transparent traffic carried in SONET/SDH pay load. For all practical purposes, the optical connections are treated as SONET/SDH connections and are mesh restored based on line or path defects. Of note, optical networks are now being deployed with OTN carrying traffic. Further, mesh restoration in OTN is being adapted from Generalized Multi-Protocol Label Switching (GMPLS) protocols. However, there remain issues in OTN mesh restoration relative to automatic discovery, PCE and also on different mesh restoration behavior such as MSP, Regroom, Revert, Selective bandwidth usage, avoiding bandwidth fragmentation, etc.

BRIEF SUMMARY OF THE INVENTION

In an exemplary embodiment, an optical node includes a plurality of ports operating links according to Optical Transport Network (OTN); and a control module in communication with each of the plurality of ports, wherein the control module operates a signaling and routing protocol; wherein the control module is configured to: direct each of the plurality of ports to advertise bandwidth in the signaling and routing protocol, the bandwidth is advertised in terms of OTN bandwidth; and communicate with other optical nodes via the signaling and routing protocol using overhead associated with the OTN links. The signaling and routing protocol includes one of Optical Signaling and Routing Protocol (OSRP), Automatically Switched Optical Network (ASON), and Generalized Multi Protocol Label Switching (GMPLS). The advertised bandwidth includes any of Optical Channel Data Unit n, where n=0, 1, 2, 3, and Optical channel Payload Virtual Containers. The signaling and routing protocol communicates to the other optical nodes via any of the General Communication Channels (GCC) in the OTN overhead including GCC0, GCC1, GCC2 or GCC1+2. The optical node further includes one or more inputs to the plurality of ports operating links according to SONET or SDH, wherein the one or more inputs utilize the signaling and routing protocol via overhead associated with the SONET or SDH links. The signaling and routing protocol communicates over both the SONET or SDH overhead and the OTN overhead. The bandwidth is further advertised in terms of SONET bandwidth for SONET or SDH links. The optical node further includes a Private Network-to-Network Interface (PNNI) Topology State Element (PTSE) to generate OTN bandwidth traffic generated for each OTN link, wherein the PTSE is configured to be sent from the control module. The optical node further includes a Traffic descriptor information element to specify the set of traffic parameters for OTN. The optical node further includes one or more databases in the control module configured for maintaining topology and bandwidth of a network associated with the node; and path computation logic in the control module configured to provide routes through the network based on the one or more databases; wherein the one or more databases are configured to segregate OTN and SONET/SDH bandwidth. The control module comprises provisioning interfaces to create and establish OTN SNCs, and wherein the control module automatically or manually performs path computation with least cost path. The control module is configured to mesh restore the Sub Network Connections responsive to failures or defects. The failures include any of OTUk-LOF, OTUk-AIS, OTUk-LOS, OTUk-BDI, OTUk-TIM, and equipment faults; and wherein the defects include any of ODUk-AIS, ODUk-BDI, ODUk-OCI, ODUk-LCK, OPVC-AIS, OPVC-BDI, OPVC-OCI, and OPVC-LCK.

In another exemplary embodiment, an optical network includes a plurality of interconnected nodes utilizing Optical Transport Network (OTN) links for the interconnection; and a signaling and routing protocol operating on the plurality of interconnected nodes over the OTN links for maintaining network topology and bandwidth and for establishing Sub Network Connections (SNCs) between any of the plurality of interconnected nodes; wherein the signaling and routing protocol communicates between the plurality of interconnected nodes via one of in-band and out-of band signaling, the in-band signaling using GCC overhead bytes associated with OTN links. The optical network further includes one or more SONET links carried over the OTN links, the one or more SONET links utilizing the signaling and routing protocol for maintaining network topology and bandwidth and for establishing Sub Network Connections (SNCs) between any of the plurality of interconnected nodes; wherein SONET and OTN bandwidth is segregated and paths are calculated separately by the signaling and routing protocol. The optical network further includes one or more databases associated with the signaling and routing protocol for maintaining topology and bandwidth of the network; and path computation logic associated with the signaling and routing protocol to provide routes through the network based on the one or more databases. The path computation logic is configured to mesh restore SNCs responsive to failures or defects. The failures include any of OTUk-LOF, OTUk-AIS, OTUk-LOS, OTUk-BDI, OTUk-TIM, and equipment faults; and wherein the defects include any of ODUk-AIS, ODUk-BDI, ODUk-OCI, ODUk-LCK, OPVC-AIS, OPVC-BDI, OPVC-OCI, and OPVC-LCK. The plurality of interconnected nodes are configured to advertise bandwidth in terms of OTN, the advertised bandwidth includes any of Optical Channel Data Unit n, where n=0, 1, 2, 3, and Optical channel Payload Virtual Containers.

In yet another exemplary embodiment, a method of mesh restoration in an Optical Transport Network (OTN) includes advertising bandwidth in terms of OTN; establishing a Sub Network Connection (SNC) of OTN links using a signaling and routing protocol; detecting a fault or defect affecting the SNC; releasing the SNC; and mesh restoring the SNC by recomputing a path in view of the fault or defect.

BRIEF DESCRIPTION OF THE DRAWINGS

The present invention is illustrated and described herein with reference to the various drawings of exemplary embodiments, in which like reference numbers denote like method steps and/or system components, respectively, and in which:

FIG. 7 is a diagram of a traffic descriptor (TD) Information Element (IE) to specify the set of traffic parameters which, together, specify a traffic control capability;

DETAILED DESCRIPTION OF THE INVENTION

Figure 1:
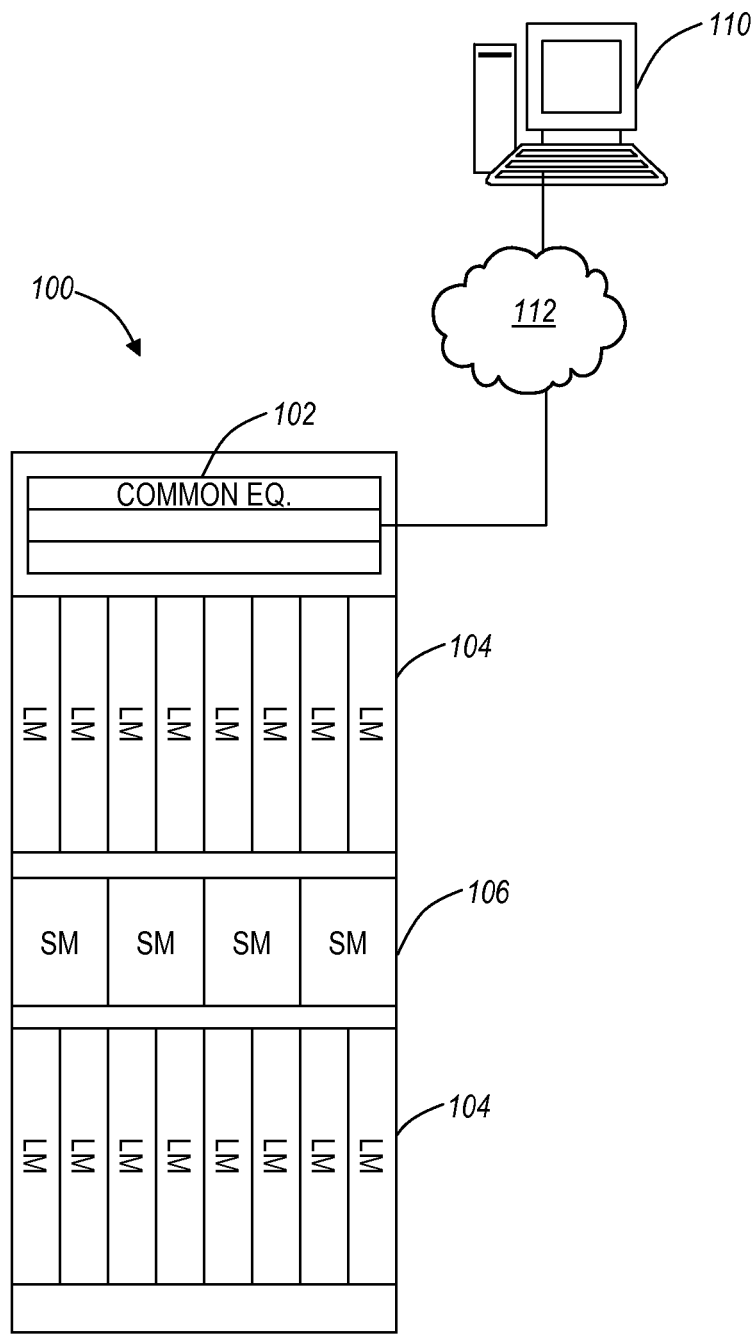
FIG. 1 is a diagram of an optical switch supporting mesh restoration in an OTN layer network.

Referring to FIG. 1, in an exemplary embodiment, an optical switch 100 is illustrated supporting mesh restoration in an OTN layered network. The optical switch 100 is a network element (NE) that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing layer 0, 1, and 2 consolidation. Generally, the optical switch 100 includes common equipment 102, line modules (LM) 104, and switch modules (SM) 106. The common equipment 102 may include power, a control module, operations, administration, maintenance, and provisioning (OAM&P) access, and the like. For example, the common equipment 102 may connect to a management system 110 through a data communication network 112. The management system 110 may include a network management system (NMS), element management system (EMS), or the like.

Additionally, the common equipment 102 may include a control plane processor configured to operate the control plane and the systems and methods described herein with regard to OTN mesh restoration.

The line modules 104 may be communicatively coupled to the switch modules 106, such as through a backplane, midplane, or the like. The line modules 104 are configured to provide ingress and egress to the switch modules 106, and are configured to provide interfaces for the OTN services described herein. In an exemplary embodiment, the line modules 104 may form ingress and egress switches with the switch modules as center stage switches for a three-stage switch, e.g. three stage Clos switch. The line modules 104 may include optical transceivers, such as, for example, 2.5 Gb/s (OC-48/STM-1, OTU1, ODU1), 10 Gb/s (OC-192/STM-64, OTU2, ODU2), 40 Gb/s (OC-768/STM-256, OTU3, ODU4), etc. Further, the line modules 104 may include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 104 may include DWDM interfaces, short reach interfaces, and the like, and may connect to other line modules 104 on remote optical switches 100, NEs, end clients, and the like. From a logical perspective, the line modules 104 provide ingress and egress ports to the optical switch 100, and each line module 104 may include one or more physical ports.

The switch modules 106 are configured to switch services between the line modules 104. For example, the switch modules 106 may provide wavelength granularity, SONET/SDH granularity such as Synchronous Transport Signal-1 (STS-1), Synchronous Transport Module level 1 (STM-1), Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical channel Payload Virtual Containers (OPVCs), etc.; Ethernet granularity; and the like. Specifically, the switch modules 106 may include both Time Division Multiplexed (TDM) and packet switching engines. The switch modules 106 may include redundancy as well, such as 1:1, 1:N, etc. In an exemplary embodiment of the present invention, the switch modules 106 are configured to provide OTN layer switching. Collectively, the line modules 104 and the switch modules 106 may provide OTN services with mesh restoration.

Figure 2:
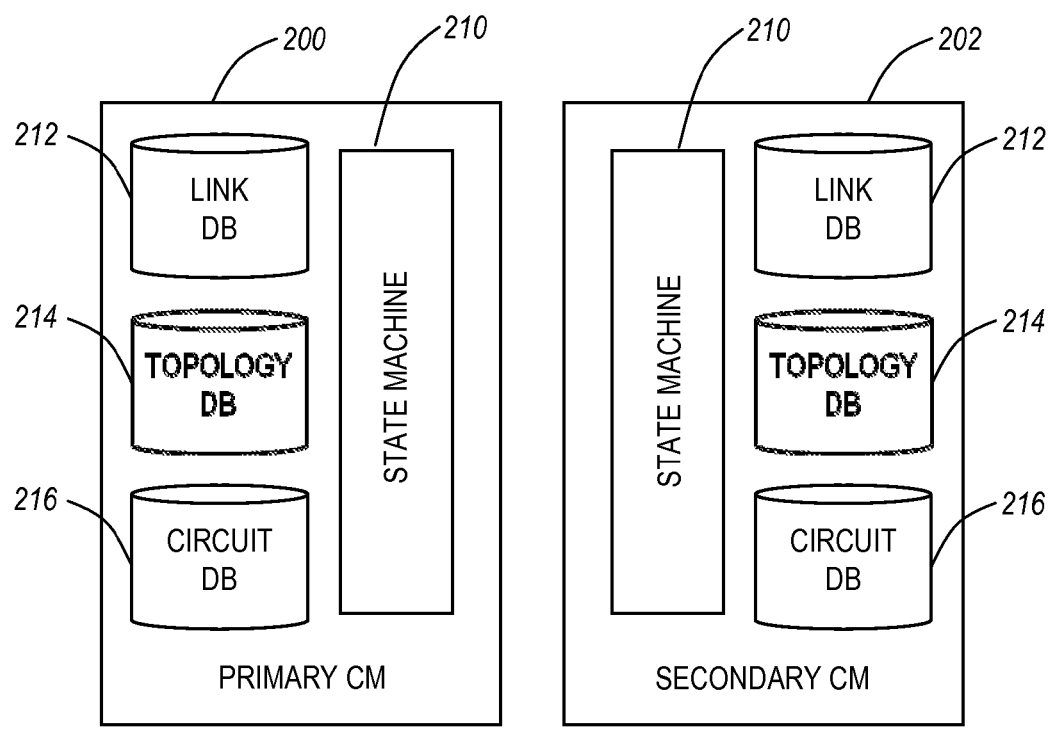
FIG. 2 is a diagram of redundant control modules (CMs) for the optical switch to provide control plane processing to enable layered OTN mesh services.

Referring to FIG. 2, in an exemplary embodiment, redundant control modules (CMs) 200, 202 for the optical switch 100 are illustrated to provide control plane processing to enable layered OTN mesh services. For example, the control plane can include Optical Signaling and Routing Protocol (OSRP), Automatically Switched Optical Networks—ITU-T Recommendation G.8080: Architecture for the Automatically Switched Optical Network (ASON) 2001, Generalized Multi-Protocol Label Switching Architecture (G-MPLS) IETF RFC 3945, 2004, and the like. The CMs 200, 202 may be part of common equipment, such as common equipment 102 in the optical switch of FIG. 1. The CMs 200, 202 may include a processor which is hardware device for executing software instructions. The processor may be any custom made or commercially available processor, a central processing unit (CPU), an auxiliary processor among several processors associated with the CMs 200, 202, a semiconductor-based microprocessor (in the form of a microchip or chip set), or generally any device for executing software instructions. When the CM 200, 202 is in operation, the processor is configured to execute software stored within memory, to communicate data to and from the memory, and to generally control operations of the CM 200, 202 pursuant to the software instructions.

The CMs 200, 202 may also include network interfaces, a data store, memory, and the like. The network interfaces may be used to enable the CMs 200, 202 to communicate on a network, such as to communicate control plane information to other CMs. The network interfaces may include, for example, an Ethernet card (e.g., 10 BaseT, Fast Ethernet, Gigabit Ethernet) or a wireless local area network (WLAN) card (e.g., 802.11a/b/g). The network interfaces may include address, control, and/or data connections to enable appropriate communications on the network. The data store may be used to store data, such as control plane information received from NEs, other CMs, etc. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media. The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. Note that the memory may have a distributed architecture, where various components are situated remotely from one another, but may be accessed by the processor.

Each of the CMs 200, 202 include a state machine 210, a link database (DB) 212, a topology DB 214, and a circuit DB 216. The CMs 200, 202 are responsible for all control plane processing. For example, the control plane may include OSRP, ASON, G-MPLS, or the like. In describing the exemplary embodiments herein, reference is made to OSRP paths, links, legs, and lines. OSRP is a distributed protocol designed for controlling a network of optical switches 100 or cross-connects (OXCs). OSRP introduces intelligence in the control plane of an optical transport system. It can perform many functions such as automatic resource discovery, distributing network resource information, establishing and restoring connections dynamically across the network, and the like. However, the present invention is not limited to OSRP. Those skilled in the art will recognize that other intelligent signaling and routing protocols that can (or can be modified to) provide similar functionality as OSRP (e.g., automatically establishing and restoring connections across the network, and the like) are within the scope of embodiments of the invention. For further background information, some of the routing and signal functions of OSRP are disclosed in commonly owned and co-pending U.S. Pat. No. 7,009,934, Mar. 7, 2006, entitled "METHOD AND APPARATUS FOR REROUTING AN OPTICAL NETWORK UPON FAULT", which is hereby fully incorporated herein by reference, and U.S. Pat. No. 6,859,431, Feb. 22, 2005, entitled "SYSTEM AND METHOD FOR CALCULATING PROTECTION ROUTES IN A NETWORK PRIOR TO FAILURE", which is hereby fully incorporated herein by reference.

The CMs 200, 202 may be configured in a redundant 1+1, 1:1, etc. configuration. The state machine 210 is configured to implement the behaviors described herein with regard to OTN mesh networking. The DBs 212, 214, 216 may be stored in the memory and/or data store. The link DB 212 includes updated information related to each link in a network. The topology DB 214 includes updated information related to the network topology, and the circuit DB 216 includes a listing of terminating circuits and transiting circuits at an NE where the CMs 200, 202 are located. The CMs 200, 202 may utilize control plane mechanisms to maintain the DBs 212, 214, 216. For example, a HELLO protocol can be used to discover and verify neighboring ports, nodes, protection bundles, and the like. Also, the DBs 212, 214, 216 may share topology state messages to exchange information to maintain identical data. Collectively, the state machine 210 and the DBs 212, 214, 216 may be utilized to advertise topology information, capacity availability, and provide connection management (provisioning and restoration). For example, each link in a network may have various attributes associated with it such as, for example, line protection, available capacity, total capacity, administrative weight, protection bundle identification, delay, and the like. The state machine 210 and the DBs 212, 214, 216 may be configured to provide automated end-to-end provisioning. For example, a route for a connection may be computed from originating node to terminating node and optimized using Dijkstra's Algorithm, i.e. shortest path from source to a destination based on the least administrative cost or weight, subject to a set of user-defined constraints.

Further, the CMs 200, 202 are configured to communicate to other CMs 200, 202 in other nodes on the network. This communication may be either in-band or out-of-band. For SONET networks, the CMs 200, 202 may use standard or extended SONET line overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the present invention includes an in-band signaling mechanism utilizing OTN overhead. The General Communication Channels (GCC) defined by ITU-T Recommendation G.709 "Interfaces for the optical transport network (OTN)" G.709 are in-band side channel used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. In the present invention, GCC0, GCC1, GCC2 or GCC1+2 may be used for in-band signaling or routing to carry control plane traffic. Based on the intermediate equipment's termination layer, different bytes may be used to carry control plane traffic. If the ODU layer has faults, it has been ensured not to disrupt the GCC1 and GCC2 overhead bytes and thus achieving the proper delivery control plane packets.

In various exemplary embodiments, the present invention includes mesh restoration capabilities in the optical switch 100 for OTN layered network. In particular, routing capabilities for OTN lines through the optical switch 100 and the CMs 200, 202 have been extended to support different bandwidth granularity rates (ODU2, ODU1, ODU0, OPVCs, etc.) and also making sure any extensions to Linear and Ring Protection are covered. OTN advertisement itself may be done in terms of ODU2, ODU1, ODU0, and OPVCs instead of STS1s, VC3s, etc. Also, Dijkstra path computations may be made separate for OTN and SONET lines to improve networks where scaling is an issue. Specifically, both OTN and SONET bandwidths may be kept as separate to incorporate the path computation logic (in the CMs 200, 202). OTN can advertise the bandwidth as both SONET and OTN making SONET connections use OTN lines if required.

Figure 3:
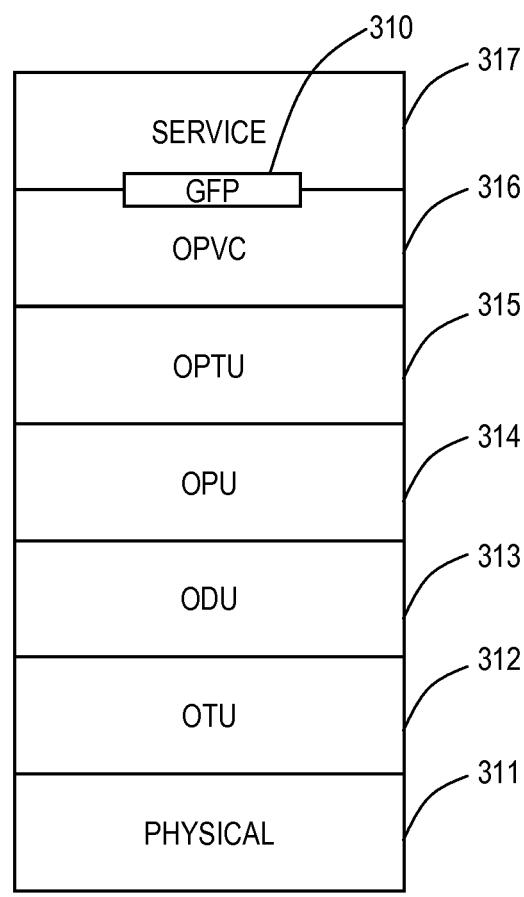
FIG. 3 is a logical diagram showing OTN layers.

Referring to FIG. 3, in an exemplary embodiment, a logical diagram is illustrated showing the OTN layers. As described herein, OTN includes a set of ITU-T standards, such as ITU-T Recommendations G.709 and G.798, which are incorporated in-full by reference herein, defining a set of Optical Network Elements connected by optical fiber links, able to provide functionality of transport, multiplexing, routing, management, supervision and survivability of optical channels carrying client signals. In one exemplary embodiment, the present invention utilizes the OTN framework to support mesh restoration. A service layer 317 represents the end user service, such as Gigabit Ethernet (GbE), Synchronous Optical Network (SONET), Synchronous Digital Hierarchy (SDH), Fiber Channel (FC), Enterprise Systems Connection (ESCON) and the like. Asynchronous services, such as GbE, FC, ESCON, and the like, are passed through a Generic Frame Protocol (GFP) mapper 310. The GFP mapper 310 may be configured to adapt a wide variety of data signals to transport networks, and may be compliant with ITU-T Recommendation G.7041, which is incorporated in-full by reference herein. An Optical channel Payload Virtual Container (OPVC) 16 handles mapping the service from the service layer 17 to a uniform format. This is the only layer that needs to change to support a new service type. An Optical channel Payload Tributary Unit (OPTU) 15 maps the output of the OPVC 16 into a timeslot and performs timing adaptations to unify the clocking. An Optical channel Payload Unit (OPU) 14 contains all of the timeslots in an OTN frame. An Optical channel Data Unit (ODU) 13 proves the path-level transport functions of the OPU 14. An Optical Transport Unit (OTU) 12 provides the section-level overhead for the ODU 13 and provides GCC0 bytes. Finally, a physical layer 11 maps the OTU 12 into a wavelength or a wavelength division multiplexing (WDM) system for transmission.

Figure 4:
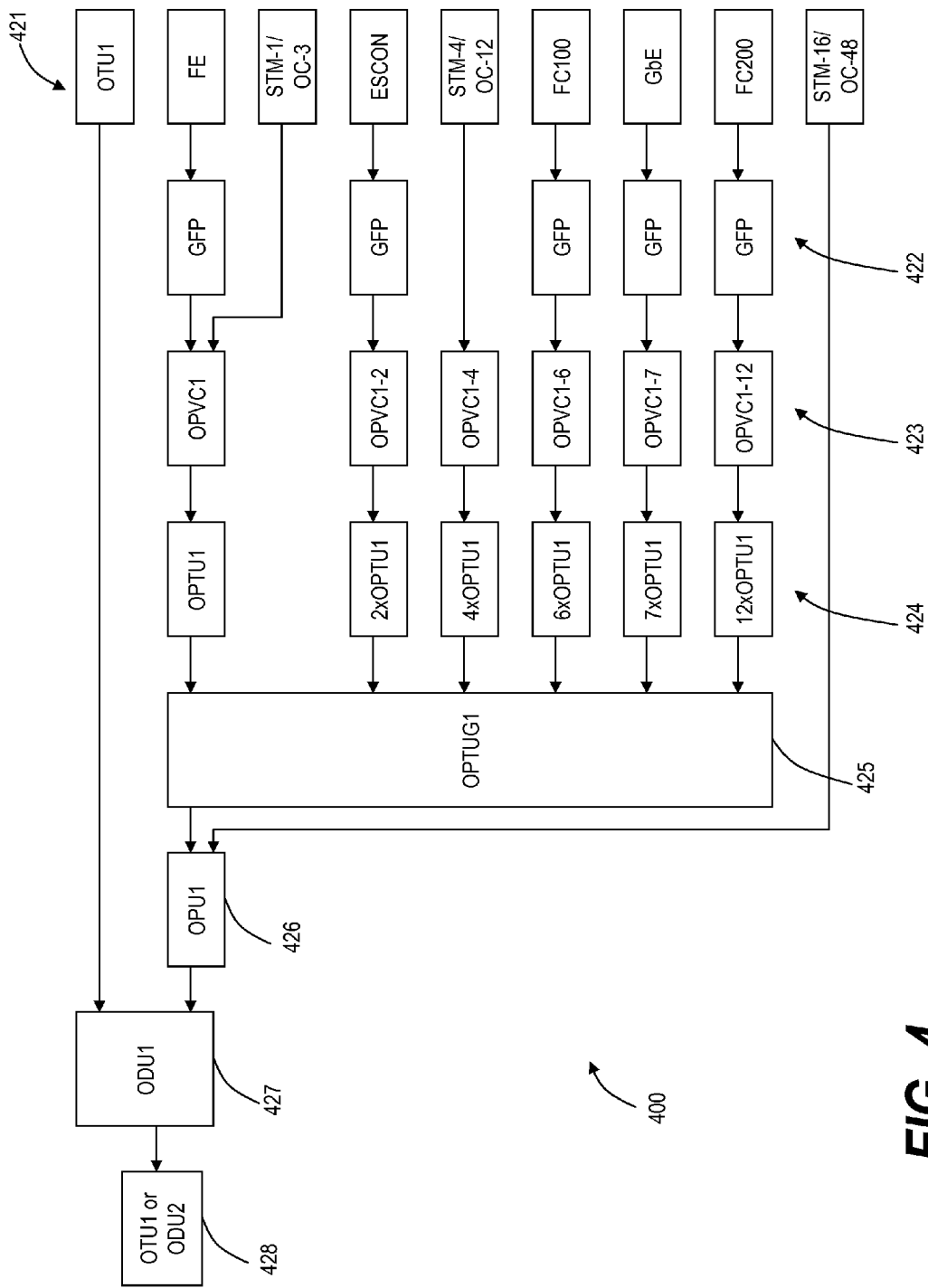
FIG. 4 is a mapping diagram of exemplary service mappings into the OTN framework.

Referring to FIG. 4, in an exemplary embodiment, a mapping diagram 400 illustrates exemplary service mappings into the OTN framework. Various services 421, such as STM-1/OC-3, Fast Ethernet (FE), OTU1, ESCON, STM-4/OC-12, Fiber Channel (FC100/FC200), GbE, STM-16/OC-48, and the like, are either mapped directly into OPVC 423 containers if synchronous or are first mapped with GFP 422 if asynchronous. As illustrated in diagram 400, different levels of OPVCs 423 are required for different services 421, and the OPVCs 423 are virtual containers which are concatenated to fit the services 421 bandwidth. For example, an STM-4 will require four OPVCs 423. Each OPVC 23 is able to contain up to 155 Mb/s. Next, the OPVCs 423 are mapped into OPTUs 424 where pointer processing is performed to adapt to node timing, and then they are multiplexed into OPTUG1 425. Then, the OPTUG1 425 is mapped into an OPU1 426, and also an STM-16/OC-48 421 service is directly mapped to the OPU1 426. After that, the OPU1 426 is mapped to an ODU1 427, and also an OTU1 421 service is directly mapped into the ODU1 427. Finally, the ODU1 is mapped to an OTU1 or ODU2 428.

The LMs 104 in conjunction with the CMs 200, 202 are configured to advertise bandwidth both in terms of OTN and SONET. The following tables illustrate exemplary embodiments of advertisements of LMs 104 in different scenarios with Physical Termination Points (PTP) and Trail Termination Points (TTPs).

TABLE 1

Line Side Configuration for an OTU1 line with LM mode 4 * 2.5G_TDM

| Scenario | Physical PTP | Logical TTPs | Advertisement |
| --- | --- | --- | --- |
| PTP Port enabled as routing (type = OTU1) | OTU1 | OTU1 | ODU1 = 1, OPVC = 16 |
| ODU1 TTP with Async/Sync CBR mode (User) | OTU1 | OTU1 ODU1 OC48 | ODU1 = 0, OPVC = 0 |
| If Child SONET Line's routing is enabled | OTU1 | OTU1 ODU1 OC48 | ODU1 = 0, OPVC = 0 STS1 = 48 |

Table 1 illustrates advertisements for an LM 104 configured with an OTU1 line and an input mode of 4×2.5 G. First, in the scenario where the PTP ports on the LM 104 are enabled as routing with a type of OTU1, the LM 104 advertises bandwidth in terms of ODU1 and OPVCs. If the scenario is a TTP Constant Bit Rate (CBR) mode, the advertisements are zero in terms of OTN. Similarly, if the scenario on the inputs are the SONET lines (input into the 4×2.5 G) are routing enabled, the LM 104 advertises zero in terms of OTN, but in terms of STS-1s for SONET. As shown here, the LM 104 is configured in this example to advertise both in terms of OTN or SONET based on the configuration on the LM 104. Note, also since the input mode is 4×2.5 G, they may be separate routing/signaling instances running at GCC0 and DCC layers (OTN and SONET) for the same line in the above example.

TABLE 1

Line Side Configuration for an OTU1 line set as SONET mode with LM mode 4 * 2.5G_TDM

| Scenario | Physical PTP | Logical TTPs | Advertisement |
| --- | --- | --- | --- |
| PTP Port enabled as routing (type = OC48_STM16) | OC48 | OC48 | STS1 = 48 |

Table 2 illustrates advertisements for an LM 104 configured with an OTU1 line set as SONET mode and an input mode of 4×2.5 G. This is the same as Table 1 except the PTP and TTPs are in SONET and thus the advertisement is in terms of STS-1s. As noted in Tables 1 and 2, each LM 104 may be configured in different modes with different PTPs and TTPs, and the advertisements are based upon this configuration.

TABLE 2

Line Side Configuration for an OTU1 line with ODU TTP mode as OPTUG1 (LM mode 4 * 2.5G_TDM)

| Scenario | Physical PTP | Logical TTPs | Advertisement |
| --- | --- | --- | --- |
| PTP Port enabled as routing (type = OTU1) | OTU1 | OTU1 | ODU1 = 1, OPVC = 16 |
| ODU1 TTP with | OTU1 | OTU1 | ODU1 = 0, |

TABLE 2-continued

Line Side Configuration for an OTU1 line with ODU TTP mode as OPTUG1 (LM mode 4 * 2.5G_TDM)

| Scenario | Physical PTP | Logical TTPs | Advertisement |
|---|---|---|---|
| OPTUG1 mode (User/Auto) | | ODU1 | OPVC = 16 |
| User created OPVC TTP under first line | OTU1 | OTU1 OPVC-1 ODU1 | ODU1 = 0, OPVC = 15 |
| Another OPVC TTP created with Async/Sync CBR mode | OTU1 | OTU1 OPVC-1 OPVC-2 OC12 ODU1 | ODU1 = 0, OPVC = 14 |

Table 3 illustrates advertisements for an LM 104 configured for an OTU1 line with an ODU TTP mode as OPTUG1 and an input mode of 4×2.5 G.

TABLE 3

Line Side Configuration for an OTU2 line with LM mode 10G (PTP as SONET_SDH)

| Scenario | Physical PTP | Logical TTPs | Advertisement |
|---|---|---|---|
| PTP Port enabled as routing (type = OC192_STM64) | OC192 | OC192 | STS1 = 192 |

Table 4 illustrates advertisements for an LM 104 configured for an OTU2 line with an SONET/SDH mode and an input mode of 10 G.

TABLE 4

Line Side Configuration for an OTU2 line with LM mode as 10G (PTP as OTN)

| Scenario | Physical PTP | Logical TTPs | Advertisement |
|---|---|---|---|
| PTP Port enabled as routing | OTU2 | OTU2 | ODU2 = 1, ODU1 = 4, OPVC = 16 |
| (type = OTU2) ODU2 TTP with Async/Sync CBR mode (User) | OTU2 | OTU2 ODU2 OC192 | |
| If Child SONET Line's routing is enabled | OTU2 | OTU2 ODU2 OC192 | STS1 = 192 |

Table 5 illustrates advertisements for an LM 104 configured for an OTU2 line with an OTN mode and an input mode of 10 G.

TABLE 5

Line Side Configuration for an OTU2 line with LM mode as 10G (PTP as OTN)

| Scenario | Physical PTP | Logical TTPs | Advertisement |
|---|---|---|---|
| PTP Port enabled as routing (type = OTU2) | OTU2 | OTU2 | ODU2 = 1, ODU1 = 4, OPVC = 16 |
| ODU2 TTP with ODTUG2 mode (User/Auto) | OTU2 | OTU2 ODU2 | ODU2 = 0, ODU1 = 4, OPVC = 16 |
| ODU1 TTP with ODTUG1 mode (User/Auto) | OTU2 | OTU2 ODU2 ODU1 | ODU2 = 0, ODU1 = 3, OPVC = 16 |
| ODU1 TTP with Async/Sync CBR mode (User) | OTU2 | OTU2 ODU2 ODU1 OC48 | ODU2 = 0, ODU1 = 2, OPVC = 16 |
| Child SONET Line Routing is enabled | OTU2 | OTU2 ODU2 ODU1 OC48 | ODU2 = 0, ODU1 = 2, OPVC = 16, STS1 = 48 |

Table 6 illustrates advertisements for an LM 104 configured for an OTU2 line with an OTN mode and an input mode of 10 G.

TABLE 6

Line Side Configuration for an OTU1 line with mode 2.5G_TDM

| Scenario | Physical PTP | Logical TTPs | CAC | ISCC | RSI | LLS | Advertisement |
|---|---|---|---|---|---|---|---|
| PTP Port enabled as routing (type = OTU1) | OTU1 | OTU1 ODU1-TCM | OTU1 | OTU1 | OTU1 | OTU1 | ODU1 = 1, TS = 2 (Payload 21) * ODU1 = 1, TS = 0 (Payload 20) * |
| ODU1 TTP with Async/Sync CBR mode (User) | OTU1 | OTU1 ODU1-TCM OC48 | OTU1 | OC48 | OTU1 | OTU1 OC48 | ODU1 = 0, TS = 0 (Payload 21) ODU1 = 0, TS = 0 (Payload 20) |
| If Child SONET Line's routing is enabled | OTU1 | OTU1 ODU1-TCM ODU1 OC48 | OTU1 | OC48 | OTU1 OC48 | OTU1 OC48 | ODU1 = 0, TS = 0 (Payload 21) ** ODU1 = 0, TS = 0 (Payload 20) ** STS1 = 48 |

Table 7 illustrates advertisements for an LM 104 configured for an OTU1 line with an OTN mode and an input mode of 2.5 G. Two instances of miniHello and Hello instances will be running at GCC0 and DCC layer for the same line in the above example. The following notes apply to the advertisements: * ODU1 Tandem Connection Monitoring (TCM) is auto created on an OSRP enabled OTU1 line and ** ODU1 TCM defects will bring down OTU1 line, as well as embedded SONET line. Further, CAC represents Call Admission Control, ISCC represents Inter-switch Communication, RSI represents Routing and Signaling Information, and LLS represents Lower-Layer Section.

Table 10 illustrates advertisements for an LM 104 configured for an OTU2 line with a SONET mode and an input mode of 10 G. Only one miniHello and Hello instance will be running at DCC layer for the SONET line in the above example.

Table 7 illustrates advertisements for an LM 104 configured for an OTU1 line with a SONET mode and an input mode of 2.5 G.

TABLE 7

Line Side Configuration for an OTU1 line set as SONET Mode

| Scenario | Physical PTP | Logical TTPs | CAC | ISCC | RSI | LLS | Advertisement |
|---|---|---|---|---|---|---|---|
| PTP Port enabled as routing (type = OC48_S TM16) | OC48 | OC48 | OC48 | OC48 | OC48 | OC48 | STS1 = 48 |

TABLE 8

Line Side Configuration for an OTU1 line with ODU TTP Mode

| Scenario | Physical PTP | Logical TTPs | CAC | ISCC | RSI | LLS | Advertisement |
|---|---|---|---|---|---|---|---|
| PTP Port enabled as routing (type = OTU1) | OTU1 | OTU1 ODU1- TCM | OTU1 | OTU1 | OTU1 | OTU1 | ODU1 = 1, TS = 2 (Payload 21) ODU1 = 1, TS = 2 (Payload 20) |
| ODU1 TTP with OPTUG1 mode (User/Auto) | OTU1 | OTU1 ODU1- TCM ODU1 | OTU1 ODU1 | OTU1 | OTU1 | OTU1 ODU1 | ODU1 = 0, TS = 2 (Payload 21) *** ODU1 = 0, TS = 2 (Payload 20) *** |

Table 9 illustrates advertisements for an LM 104 configured for an OTU1 line with an ODU TTP mode and an input mode of 2.5 G. The following notes apply to the advertisements: *** ODU1 TCM defects will bring down OTU1 line and it will cause ODU0 SNCs to mesh restore. If the Port Group mode is set to GbE mode, behavior is as of today and these PTPs are treated as drop side ports by OSRP.

TABLE 9

Line Side Configuration for an OTU2 line with mode as 10G

| Scenario | Physical PTP | Logical TTPs | CAC | ISCC | RSI | LLS | Advertisement |
|---|---|---|---|---|---|---|---|
| PTP Port enabled as routing (type = OC19 2_STM64) | OC192 | OC192 | OC192 | OC192 | OC192 | OC192 | STS1 = 192 |

TABLE 10

Line Side Configuration for an OTU2 line with mode as 10G (PTP as OTN)

| Scenario | Physical PTP | Logical TTPs | CAC | ISCC | RSI | LLS | Advertisement |
|---|---|---|---|---|---|---|---|
| PTP Port enabled as routing (type = OTU2) | OTU2 | OTU2 ODU2-TCM | OTU2 | OTU2 | OTU2 | OTU2 | ODU2 = 1, ODU1 = 4, TS = 8 (Payload 21) ODU2 = 1, ODU1 = 4, TS = 2 (Payload 20) |
| ODU2 TTP with Async/Sync CBR mode (User) | OTU2 | OTU2 ODU2-TCM ODU2 OC192 | OTU2 OC192 | OTU2 | OTU2 | OTU2 OC192 | ODU2 = 0, ODU1 = 0, TS = 0 (Payload 21) ODU2 = 0, ODU1 = 0, TS = 0 (Payload 20) |
| If Child SONET Line's routing is enabled | OTU2 | OTU2 ODU2-TCM ODU2 OC192 | OTU2 ODU2 OC192 | OTU2 OC192 | OTU2 OC192 | OTU2 OC192 | ODU2 = 0, ODU1 = 0, TS = 0 (Payload 20) **** ODU2 = 0, ODU1 = 0, TS = 0 (Payload 21) **** STS1 = 192 |

Table 11 illustrates advertisements for an LM 104 configured for an OTU2 line with a OTN mode and an input mode of 10 G. The following notes apply to the advertisements: **** ODU2 TCM defects will bring down OTU2 line as well as embedded SONET line. Two sets of miniHello and Hello instances will be running in parallel at GCC0 and DCC layer for the same line in the above example.

Table 12 illustrates advertisements for an LM 104 configured for an OTU2 line with a OTN PTP mode. ODU2 TCM defects will bring down OTU2 line as well as embedded SONET line. If the mode is set as 1*10 GbE. Then routing is disabled for that line and it acts today's GigE Port. Only one ODU2 CTP is created with a mapper line. Termination for 10 GigE is only ODU2.

TABLE 11

Line Side Configuration for an OTU2 line with LM mode as 10G (PTP as OTN)

| Scenario | Physical PTP | Logical TTPs | CAC | ISCC | RSI | LLS | Advertisement |
|---|---|---|---|---|---|---|---|
| PTP Port enabled as routing (type = OTU2) | OTU2 | OTU2 ODU2-TCM | OTU2 | OTU2 | OTU2 | OTU2 | ODU2 = 1, ODU1 = 4, TS = 8 (Payload 21) ODU2 = 1, ODU1 = 4, TS = 2 (Payload 20) |
| ODU2 TTP with ODTUG2 mode (User/Auto) | OTU2 | OTU2 ODU2-TCM ODU2 | OTU2 ODU2 | OTU2 | OTU2 | OTU2 ODU2 | ODU2 = 0, ODU1 = 4, TS = 8 (Payload 21) ODU2 = 0, ODU1 = 4, TS = 2 (Payload 20) |
| ODU1 TTP with ODTUG1 mode (User/Auto) | OTU2 | OTU2 ODU2-TCM ODU2 ODU1 | OTU2 ODU2 ODU1 | OTU2 | OTU2 | OTU2 ODU2 ODU1 | ODU2 = 0 ODU1 = 3, TS = 6 (Payload 21) ODU2 = 0, ODU1 = 3, TS = 2 (Payload 20) |
| ODU1 TTP with Async/Sync CBR mode (User) | OTU2 | OTU2 ODU2-TCM ODU2 ODU1 OC48 | OTU2 ODU2 ODU1 OC48 | OTU2 OC48 | OTU2 | OTU2 ODU2 ODU1 OC48 | ODU2 = 0, ODU1 = 2, TS = 4 (Payload 21) ODU2 = 0, ODU1 = 2, TS = 2 (Payload 20) |
| Child SONET Line Routing is enabled | OTU2 | OTU2 ODU2-TCM ODU2 ODU1 OC48 | OTU2 ODU2 ODU1 OC48 | OTU2 OC48 | OTU2 OC48 | OTU2 ODU2 ODU1 OC48 | ODU2 = 0, ODU1 = 2, TS = 4 (Payload 21) ODU2 = 0, ODU1 = 2, TS = 2 (Payload 20) STS1 = 48 |

Tables 1-12 are listed above for illustration purposes and those of ordinary skill in the art will recognize additional bandwidth advertisements are contemplated by the present invention.

The present invention also includes routing changes to OSRP such as a new link Private Network-to-Network Interface (PNNI) Topology State Element (PTSE) has been added to generate OTN bandwidth traffic generated for each OSRP OTN link outgoing from the generating node. PTSE refers to a collection of PNNI information that is flooded among all logical nodes within a peer group. An OTN routing packet itself carries OTN bandwidth information across the network identifying, whether the bandwidth is fragmented, max connection size available and granularity of the connection. Further, the OTN routing packet may also carry priority, protection preference and metrics (Administrative Weight, Maximum Bandwidth, Available Bandwidth, Delay). Bandwidth itself can carry up to 20 lines or more of bandwidth capacity information (for link aggregation support such as described in commonly assigned U.S. Pat. No. 7,414,985, Aug. 19m 2008, entitled "LINK AGGREGATION" which is hereby fully incorporated herein by reference).

The present invention also includes Resource Availability Information Group (RAIG) Flag behavior change based on type of Link Information Group (IG). Today there are 32 RAIGs (depending upon priority and protection-Type=8*4=32) per link IG. Four priority types are used for SONET/SDH link and remaining four are used for OTN. Hence for OTN, there will be a maximum of 4*4=16 RAIGs.

TABLE 12

RAIG Flags

| Bit | Connection Type; Priority |
| --- | --- |
| 16 (MSB) | OLC; 4 (highest) |
| 15 | OLC; 3 (higher) - Not Used |
| 14 | OLC; 2 (lower) - Not Used |
| 13 | OLC; 1 (lowest) |
| 12 | SLC; 4 (highest) |
| 11 | SLC; 3 (higher) - Not Used |
| 10 | SLC; 2 (lower) - Not Used |
| 9 | SLC; 1 (lowest) |
| 8 to 1 (LSB) | Reserved |

Extra fields in protection type Flags indicate how to determine the BW information. Since the 6 to 15 MSB is not used, setting of this field would indicate different size lengths related to BW information.

TABLE 13

Protection Type Flags

| Bit | Protection Type |
| --- | --- |
| 1 (LSB) | No protection line |
| 2 | Protection Line |
| 3 | Linear |
| 4 | Ring protection 1 |
| 5 | Ring protection 2 |
| 6 to 9 | Reserved |
| 10 to 12 | Indicates number of unit32 fields allocated for Available BW Type (up to 7 value) |
| 13 to 16 (MSB) | Indicates number of unit32 fields allocated for Max BW Type (up to 15 value)) |

Total maximum BW for an aggregated line (20 lines) could be

16*16*20=5120 OPVCs (13 bits)=16 bits

16*2*20=640 ODU0s (9 bits)=16 bits

16*20=320 ODU1s (9 bits)=16 bits

4*20=80 ODU2s (7 bits)=14 bits

20=ODU2-E (5 bits)=6 bits

20=ODU3-E (5 bits)=6 bits

20=ODU3 (5 bits)=6 bits

TABLE 14

OTN Bandwidth Maximum BW Value

| Bandwidth Attribute | 32 (MSB) to 25 (8 bits) | 24 to 17 (8 bits) | 16 to 1 (LSB) (16 bits) |
| --- | --- | --- | --- |
| Maximum BW1 | ODU0s | ODU0s | OPVCs |
| Maximum BW2 | ODU2s | ODU2s | ODU1s |
| Maximum BW3 | ODU3-E | ODU2-E | ODU3s |

TABLE 15

OTN Bandwidth Available BW Value

| Bandwidth Attribute | | | 32-17 (MSB) | | | 16-1 (LSB) | |
| --- | --- | --- | --- | --- | --- | --- | --- |
| | Available BW1 | | | ODU0 | | | OPVC |
| Bandwidth Attribute | 32-29 (MSB) | 28-27 | 26-23 | 22-19 | 18-15 | 14-9 | 8-1 (LSB) |
| Available BW2 | Reserved | ODU3-E | ODU3 | ODU2-E | ODU2 | ODU2 | ODU1 |

For SONET information, there are two IG types defined for RAIGs such as PNNI_IG_OUT_RAIG and PNNI_IG_IN_RAIG. Same concept would be used to carry OTN information.

Figure 5A:
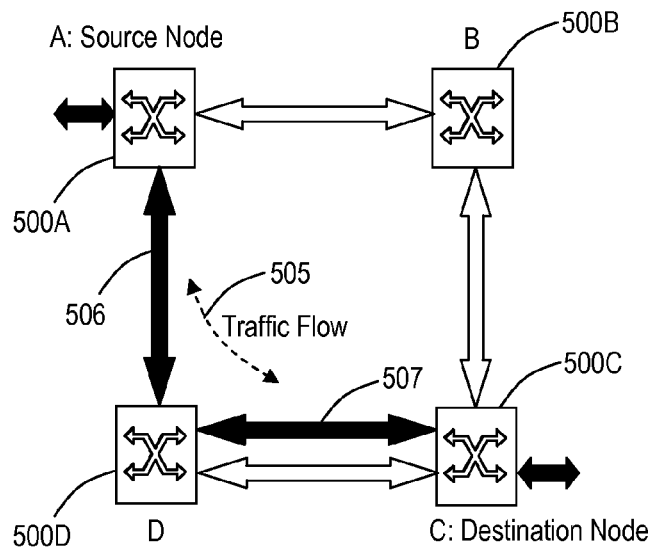
FIGS. 5A and 5B are network diagrams of mesh restoration for performing recovery in response to a failure on an OSRP line.
Figure 5B:
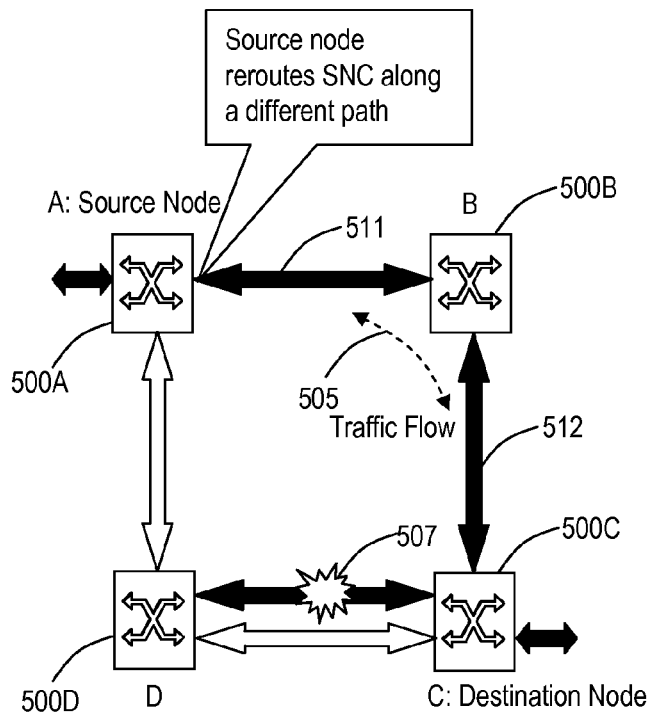

Referring to FIGS. 5A and 5B, in exemplary embodiments, mesh restoration is illustrated for performing recovery in response to a failure on an OSRP line. FIGS. 5A and 5B illustrate a network of four optical nodes 500A, 500B, 500C, 500D configured to provide optical mesh restoration over OTN connections. The OTN connection may be a Sub Network Connection (SNC). Traditionally, SNCs are a collection of one or more SONET paths or SDH (Synchronous Digital Hierarchy) paths. In the present invention, SNCs may also be a collection of one or more OTN paths, links, etc. More particularly, an SNC is a connection from a node in a separately identifiable part of a larger network to another node in the network that typically spans multiple nodes and links. As part of an SNC creation, switching paths are created along the nodes that are traversed by the SNC, thus enabling data to flow from the originating node to the destination node. In other words, an optical network can be partitioned into a set of optical sub-networks interconnected by optical links, and the SNC is a connection across an optical sub-network. In FIG. 5A, assume that prior to an SNC failure, traffic flow 505 is along a path formed between source node 500A, intermediate node 500D, destination node 500C, and lines 506 and 507. There will be a failure on the SNC when an OSRP line fails. For example, in FIG. 5B, assume that the OSRP line 507 between nodes 500D and 500C fails. If there is a failure on the SNC because of an OSRP line failure, then a signaling message is sent to the source node 500A so that the failed SNC is released to the source node 500A. Releasing an SNC results in all switching paths being torn down along all the nodes and links that are traversed by the SNC. This results in the immediate stoppage of the flow of data along the released SNC. The source node 500A then calculates an alternate path, sets up the SNC for the alternate path, and signals the rerouted SNC information to the destination node 500C. In the example of FIG. 5B, the traffic flow 505 is now along a path formed by node 500A, node 500B, node 500C, and lines 511 and 512, after Mesh Restoration is performed. The Mesh Restoration method also involves the following activities: (1) transmission of signaling messages to the source node and to the destination node via the alternate path1 (2) transmission of routing messages to update the state of the network during and after SNC restoration; and (3) transmission of node management events from the nodes on the network paths (affected by the SNC restoration) to management stations, in order to provide the status of the SNCs.

Figure 6:
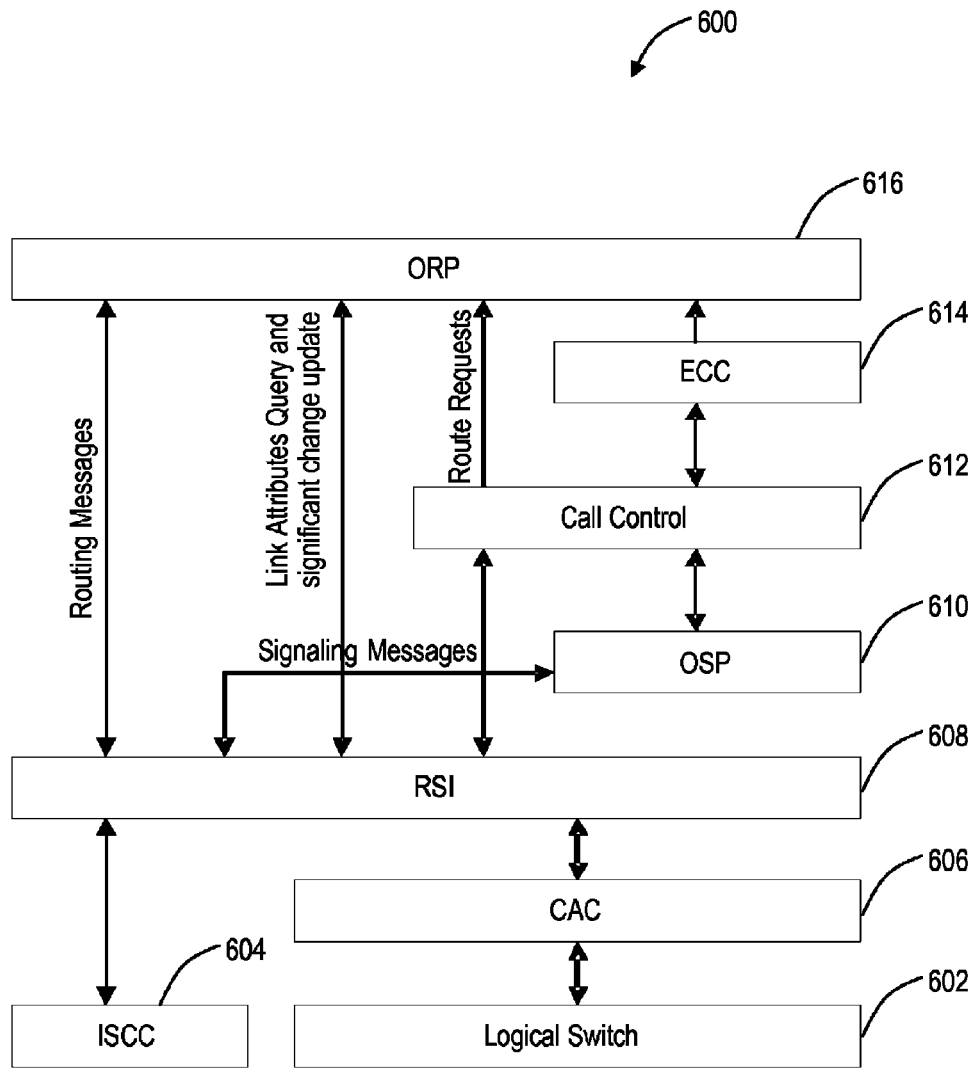
FIG. 6 is a functional block diagram of OSRP components at the optical switch of FIG. 1.

Referring to FIG. 6, in an exemplary embodiment, a functional block diagram illustrates OSRP components 600 at an optical switch. The components 600 include a logical switch 602, InterSwitch Communications Channel (ISCC) 604, Call Admission Control (CAC) 606, Routing and Signaling Information (RSI) 608, Optical Signaling Protocol (OSP) 610, Call Control 612, Embedded Communications Channel (ECC) 614, and Optical Routing Protocol (ORP) (616). These various components 600 may be implemented via hardware in an optical switch or node such as the CMs 200, 202. The logical switch 602 represents a logical representation of physical hardware in the actual switch, node, etc. The physical hardware generally includes a plurality of ports (ingress, egress) that may include OTN or SONET/SDH lines. The ISCC 604 provides the in-band or out-of-banding signaling described herein for communication between switches, nodes, etc. The CAC 606 handles requests for connections and manages resource availability for each transmission line attached to a given switch, node, etc. The CAC 606 also determines if the requested connection can be admitted, taking into account type, size, etc. The RSI 608 manages all routing and signaling information including all significant change events for routing, parameter (metric) queries from routing, bandwidth checks and reservations from signaling, and the like. The OSP 610 is the signaling protocol interfacing the RSI 608, the Call Control 612, the ECC 614, and the ORP 616. The Call Control 612 manages SNCs on all the end points except originating and terminating drop sides. The ECC 614 implements management interfaces for SNC Endpoints and Designated Transit Lists (DTLs), manages originating and terminating SNC endpoints, manages DTLs, persists originating and terminating SNC endpoints, persists CallController information at originating and terminating nodes, persists DTLs, generates SNC and DTL related events and alarms, and generates diagnostics information from failure causes of ECC, CallController and Routing. Further, the ECC 614 manages the following for originating SNCs: setup, protection pre-computation, mesh restore, revert, and regroom. In an exemplary embodiment of the present invention, the various components 600 segregate OTN and SONET/SDH bandwidth to ensure path computation times does not exceed preset values.

Referring to FIG. 7, in an exemplary embodiment, a traffic descriptor (TD) Information Element (IE) 700 is illustrated to specify the set of traffic parameters which, together, specify a traffic control capability. The IE 700 is a new traffic descriptor for OTN Setup message. A new OTN OSRP TD will be created for encoding and decoding this IE 700. This IE 700 in the Setup Message has to carry specific traffic requirements, which could be: ODU2, ODU1, ODU01-$yn$ ($y=1$ to 32), OPVC1-$xn$ ($x=1$ to 16); ODU3, ODU3-E, ODU2-E, ODU2-$nx$, ODU2-E$nx$, ODU1-$nx$, OPVC1-$nv$; Transport Logical Connection (TLC), Open Logical Channel (OLC) or concatenated OLC; as of current behavior, only symmetric bi-directional point-to-point connections are supported, i.e., only forward traffic requirements will be specified; and indicating remote end point information for the SNC. Based on Master and Slave Node (to avoid glare conditions in bandwidth allocation on a single link), the OTN signaling messages use same analogy that of SONET connections to ensure that Master node binds the BW whereas Slave node accepts the BW reserved by master node (see, e.g., commonly assigned U.S. Pat. No. 7,525,981, Apr. 28, 2009, "GLARE RESOLUTION," which is hereby fully incorporated herein by reference). For example, glare resolution may include computing a path through at least a first node and a second node in a network; sending a signal to the first node to establish an SNC across a link between the nodes; after receiving the signal, the first node preventing the first node from allocating a first line and a first timeslot for a first SNC; and subsequent to preventing allocating by the first node, the first node establishes a link between the first and second node to determine a master slave relationship respectively between the first and second node; subsequent to establishing a link between the first and second node, designating a status of either the first or second node as a slave node; subsequent to establishing a link between the first and second node, designating a status of the other of the first or second node as a master node; allocating, by the designated master node, the first line and the first timeslot for the first SNC and a second line and a second timeslot for a second SNC. If a particular OTN line has been fragmented by user, then that is picked as a first choice before automatically fragmenting the OTN line. The connection ID IE contains the Virtual Path Identifier (VPI) and Virtual Channel Identifier (VCI) number in Asynchronous Transfer Mode (ATM). In ATM, the same VPI, VCI number is used for both sides (forward and backward) of the connection. In SONET, however, when a call setup is requesting an asymmetric bi-directional connection, the Connection ID IE in the Connect message, will have to carry two sets of channel IDs, one for the forward and one for the backward direction. In OSRP, there may be only support symmetric bi-directional connections. In an OTN connection, this would require to carry information as listed below:

TABLE 16

OTN Vpci Hierarchy in signaling

| Traffic Type | RsiLine | Vpi/Vci Hierarchy | Remarks |
|---|---|---|---|
| ODU1 | OTU1 | Line - OTU1<br>Type - ODU1<br>Vci1 - ODU Number<br>Vci2 - NA | OTU1 is always the RsiLine information even in case of aggregation |
| OPVC | OTU1 | Line - OTU1<br>Type - OPVC<br>Vci1 - ODU Number<br>Vci2 - OPVC Number | |
| ODU2 | OTU2 | Line - OTU2<br>Type - ODU2<br>Vci1 - NA | |
| ODU1 | OTU2 | Line - OTU2<br>Type - ODU1<br>Vci1 - ODU1 Number<br>Vci2 - NA | |
| OPVC | OTU2 | Line - OTU2<br>Type - OPVC<br>Vci1 - ODU1 Number<br>Vci2 - OPVC Number | |
| ODU3 | OTU3 | Line - OTU3<br>Type - ODU3<br>Vci1 - NA | |
| ODU2 | OTU3 | Line - OTU3<br>Type - ODU2<br>Vci1 - ODU2 Number<br>Vci2 - NA | |
| ODU1 | OTU3 | Line - OTU3<br>Type - ODU1<br>Vci1 - ODU2 Number + ODU1 Number<br>Vci2 - NA | |
| OPVC | OTU3 | Line - OTU3<br>Type - ODU1<br>Vci1 - ODU2 Number + ODU1 Number<br>Vci2 - OPVC Number | |
| ODU0 | OTU1 | Line - OTU1<br>Type - ODU0<br>Vci1 - ODU Number<br>Vci2 - ODU0 Number | |
| ODU0 | OTU2 | Line - OTU2<br>Type - ODU0<br>Vci1 - ODU1 Number<br>Vci2 - ODU0 Number | |
| ODU0 | OTU3 | Line - OTU3<br>Type - ODU1<br>Vci1 - ODU2 Number + ODU1 Number<br>Vci2 - ODU0 Number | |

For Note 1 in FIG. 7, this is present when Facility Associated signaling is set to 0, i.e., OPVC/ODU0 Associated signaling to indicate that the forward connection Id can be carrying the parent line information. Facility associated signaling (Octet 5) is illustrated in the following table:

| Bits | | | |
|---|---|---|---|
| 3 | 2 | 1 | Meaning |
| 0 | 0 | 0 | OPVC Associated |
| 0 | 0 | 1 | ODU1 Associated |
| 0 | 1 | 0 | ODU2 Associated |
| 0 | 1 | 1 | ODU3 Associated |
| 1 | 0 | 0 | ODU0 Associated |

Forward Connection Id—If it is OPVC Associated or ODU0 Associated, then first 4 bytes indicate ODU1 number and next 4 bytes indicate ODU2 number.
Coding Type

| Bit 2 | Bit 1 | |
|---|---|---|
| 0 | 0 | Channel numbers encoded in bitmap format |
| 0 | 1 | Terminating on EptName |
| 1 | 0 | VTP Termination |

Another Coding Type may be added to specify channel numbers and groups of channel numbers explicitly. Such an arrangement would be useful for future OTN connections. The Size is the Number of octets required to represent the Connection Id (forward or backward). There may be a maximum capacity of 32 octets (enough to represent 16 ODU1s, 16 OPVCs/ODU0s, 192 channels as a bitmap for OPVC) sufficient for a OTN connection. Absence of the Backward Connection ID represents a symmetric bi-directional connection. Presence of the Backward Connection ID with the ID set to zero represents a unidirectional connection.

ODU0/OPVC/ODUs are allocated in the SETUP phase or CONNECT phase based on whether the interface is Master or Slave. Across an OSRP link, the node with higher node id selects either a particular ODU or ODU0/OPVC within an ODU as stated in Table 16. OTN Vpci Hierarchy in signaling. The node at the other end of the OSRP link with lower node ID should allocate the same ODU or ODU0/OPVC within that particular ODU. If the end point on that OSRP line is not available, the SETUP or CONNECT fails and a crank-back is generated. End point selection will always be from high to low. The OSRP end point selected is encoded as Connection-ID IE.

Figure 8:
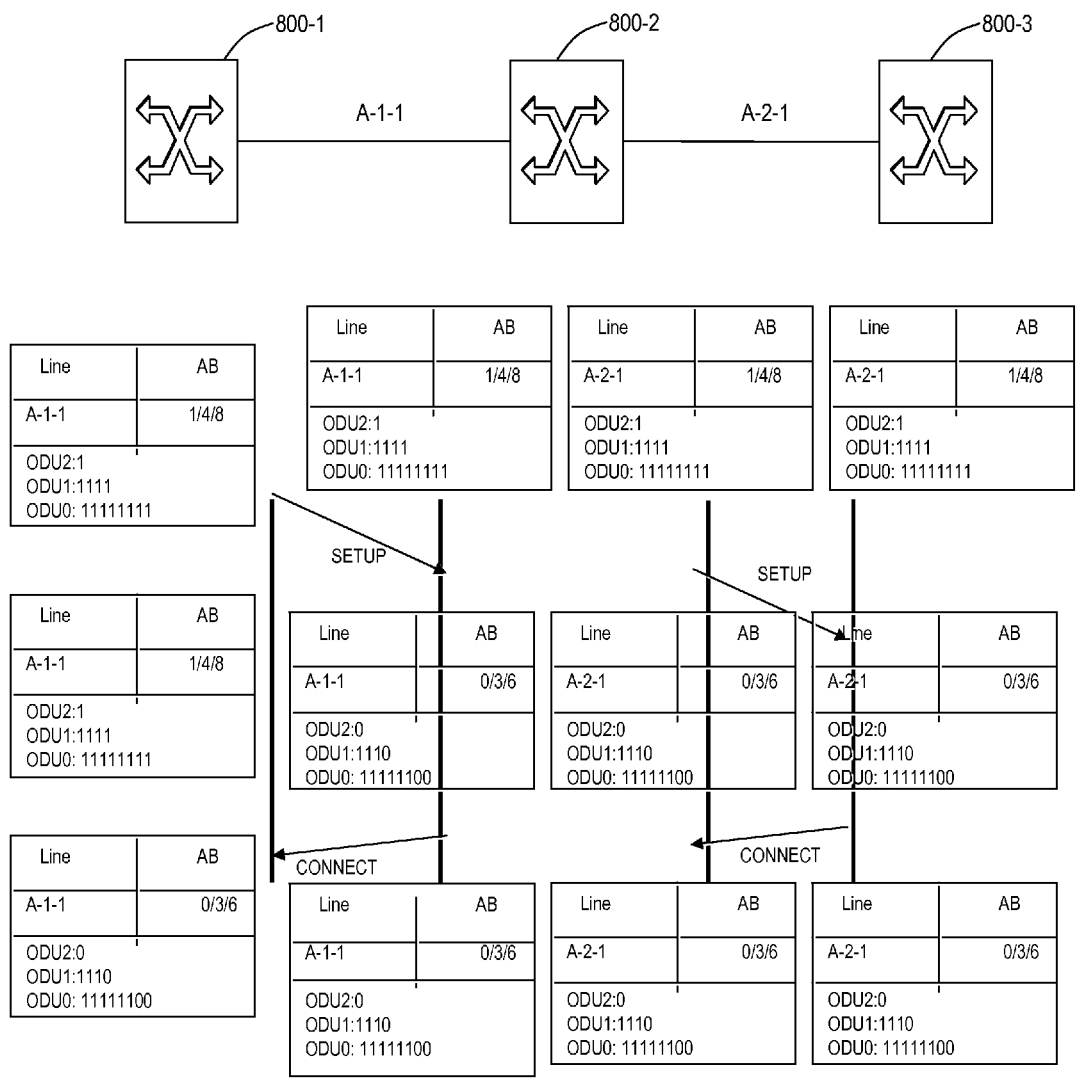
FIG. 8 is a network diagram of three nodes with OTN links using a signaling and routing protocol.

Referring to FIG. 8, in an exemplary embodiment, a network of three nodes 800-1, 800-2, 800-3 is illustrated with OTN links using a signaling and routing protocol. Initially each link A-1-1, A-2-1 has available bandwidth of ODU2=1, ODU1=4, ODU0=8, i.e. on each line 8 ODU0s are available. FIG. 8 illustrates an example of allocating an ODU0 of size 2 and the associated messages exchanged between the three nodes 800-1, 800-2, 800-3.

Figure 9:
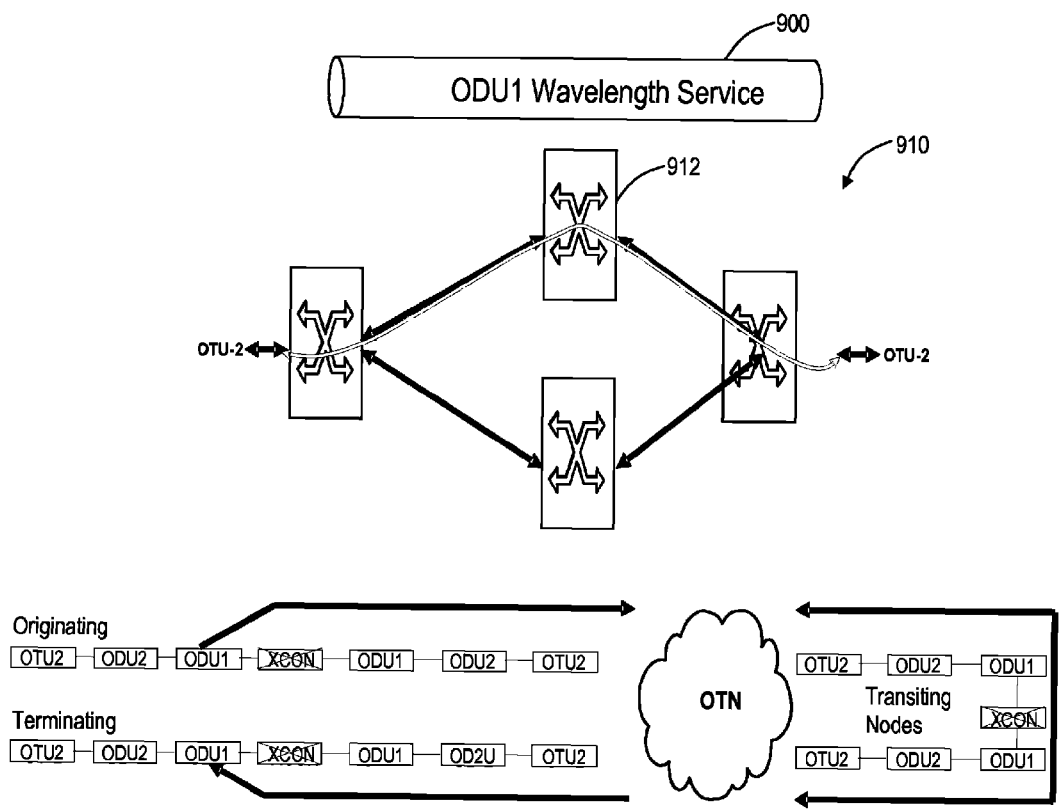
FIG. 9 is a diagram of an ODU1 wavelength service on a network using OTN links with a signaling and routing protocol.
Figure 10:
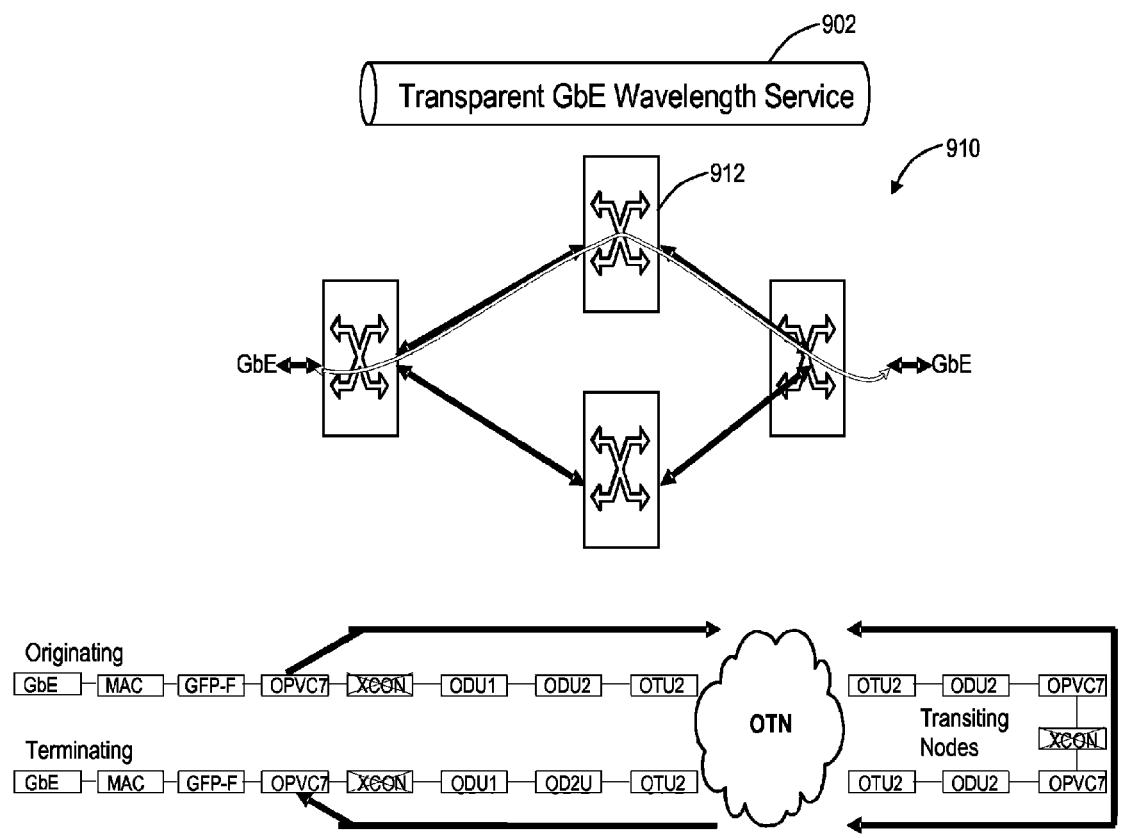
FIG. 10 is a diagram of a transparent GbE wavelength service on a network using OTN links with a signaling and routing protocol.

The present invention may utilize various OTN faults and defects to trigger mesh restoration. For example, the following OTUk faults fail the OTN line and this may cause connections to mesh restore OTUk-LOF (Loss of Frame), OTUk-AIS (Alarm Indication Signal), OTUk-LOS (Loss of Signal), OTUk-BDI (Backward Defect Indication), OTUk-TIM (Trail Trace Identifier Mismatch) (with enabling of consequent action), Equipment Faults, and the like. The following ODU/OPVC path level defects may trigger SNCIC mesh restoration for ODUk/OPVC1-Xn connections ODUk-AIS, ODUk-BDI, ODUk-OCI (Open Connection Indication), ODUk-LCK (Locked), OPVC-AIS, OPVC-BDI, OPVC-OCI, OPVC-LCK, and the like. Note that ODUk-LCK, ODUk-OCI, OPVC-OCI and OPVC-LCK path defects may not typically be present at SNC endpoints in a network with all optical switches 100. It is possible that intermediate equipment could generate these defects. FIGS. 9 and 10 illustrate examples of Mesh Restoration based on OTN Defects (both line and path level defects).

Referring to FIGS. 9 and 10, in exemplary embodiments, an ODU1 wavelength service 900 and a transparent GbE wavelength service 902 are illustrated on a network 910 using OTN links with a signaling and routing protocol. The network 910 includes four nodes 912 each configured to provide OTU2 links operating a signaling and routing protocol for establishing and maintaining OTN links. Note, the line side may be an OTU2 or OTU1 port—FIG. 9 assumes ODU1 embedded within an OTU2 port. FIGS. 9 and 10 are subset of applications which indicate the way nodes 912 create the cross connects at the originating, intermediate and terminating nodes in the OTN cloud. FIG. 9 illustrates an ODU1 carried by an ODU1 SNC. This example is also extended to carry ODU-2 and OPVC services too. ODU-1/ODU-2/ODU0/OPVC cross connects at originating, terminating and intermediate nodes. The node 912 creates the ODU-1/ODU-2/ODU0/OPVC end points based on BW available in the network. There is faster data path solution to Fabric (TM) to auto create these objects. FIG. 10 illustrates a GbE carried by an OPVC7/ODU0 SNC. In FIG. 10, GbE traffic is carried in OPVC-7/ODU0 bandwidth across the network as single connection. Any faults will result in complete restoration of GigE traffic at once without a need for Virtual Concatenation (VCAT) or Link Capacity Adjustment Scheme (LCAS).

Thus, the present invention extends the use of a signaling and routing protocol to optical networks utilizing OTN as well as SONET/SDH. Advantageously, the present invention provides automated OTN node and bandwidth discovery and end-to-end OTN connection provisioning, e.g. "point and click" provisioning. The OTN network may use the signaling and routing protocol for manual or automatic route provisioning as well as faster switching using SNCP (Sub Network Connection Permanent). The present invention extends the benefits of mesh provisioning and restoration to OTN based networks.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An optical node, comprising:
 a plurality of ports operating links according to Optical Transport Network (OTN); and
 a control module in communication with each of the plurality of ports, wherein the control module operates a signaling and routing protocol;
 wherein the control module is configured to:
  direct each of the plurality of ports to advertise bandwidth in the signaling and routing protocol, the bandwidth is advertised in terms of OTN bandwidth;
  communicate with other optical nodes via the signaling and routing protocol using overhead associated with the OTN links;
  operate dual instances of HELLO messages in Synchronous Optical Network (SONET) overhead and OTN overhead; and
  manage SONET bandwidth and OTN bandwidth separately from a path computation perspective.

2. The optical node of claim 1, wherein the signaling and routing protocol comprises one of Optical Signaling and Routing Protocol (OSRP), Automatically Switched Optical Network (ASON), and Generalized Multi Protocol Label Switching (GMPLS).

3. The optical node of claim 1, wherein the advertised bandwidth comprises any of Optical Channel Data Unit n, where n=0, 1, 2, 3, and Optical channel Payload Virtual Containers.

4. The optical node of claim 1, wherein the signaling and routing protocol communicates to the other optical nodes via any of the General Communication Channels (GCC) in the OTN overhead comprising GCC0, GCC1, GCC2 or GCC1+2, an optical service channel, or an out-of-band connection.

5. The optical node of claim 1, further comprising:
 one or more inputs to the plurality of ports operating links according to SONET or SDH, wherein the one or more inputs utilize the signaling and routing protocol via overhead associated with the SONET or SDH links.

6. The optical node of claim 5, wherein the signaling and routing protocol communicates over both the SONET or SDH overhead and the OTN overhead.

7. The optical node of claim 5, wherein the bandwidth is further advertised in terms of SONET bandwidth for SONET or SDH links.

8. The optical node of claim 1, further comprising:
 a Private Network-to-Network Interface (PNNI) Topology State Element (PTSE) to generate OTN bandwidth traffic generated for each OTN link, wherein the PTSE is configured to be sent from the control module.

9. The optical node of claim 1, further comprising:
 a Traffic descriptor information element to specify the set of traffic parameters for OTN.

10. The optical node of claim 1, further comprising:
 one or more databases in the control module configured for maintaining topology and bandwidth of a network associated with the node; and
 path computation logic in the control module configured to provide routes through the network based on the one or more databases;
 wherein the one or more databases are configured to segregate OTN and SONET/SDH bandwidth.

11. The optical node of claim 10, wherein the control module comprises provisioning interfaces to create and establish OTN SNCs, and wherein the control module automatically or manually performs path computation with least cost path.

12. The optical node of claim 11, wherein the control module is configured to mesh restore the Sub Network Connections responsive to failures or defects.

13. The optical node of claim 11, wherein the failures comprise any of OTUk-LOF, OTUk-AIS, OTUk-LOS, OTUk-BDI, OTUk-TIM, and equipment faults; and wherein the defects comprise any of ODUk-AIS, ODUk-BDI, ODUk-OCI, ODUk-LCK, OPVC-AIS, OPVC-BDI, OPVC-OCI, and OPVC-LCK.

14. An optical network, comprising:
 a plurality of interconnected nodes utilizing Optical Transport Network (OTN) links for the interconnection; and
 a signaling and routing protocol operating on the plurality of interconnected nodes over the OTN links for maintaining network topology and bandwidth and for establishing Sub Network Connections (SNCs) between any of the plurality of interconnected nodes;

wherein the signaling and routing protocol communicates between the plurality of interconnected nodes via one of in-band and out-of band signaling, the in-band signaling using GCC overhead bytes associated with OTN links;

wherein dual instances of HELLO messages are operated in Synchronous Optical Network (SONET) overhead and OTN overhead; and wherein SONET bandwidth and OTN bandwidth are managed separately from a bath computation perspective.

15. The optical network of claim 14, further comprising:
one or more SONET links carried over the OTN links, the one or more SONET links utilizing the signaling and routing protocol for maintaining network topology and bandwidth and for establishing Sub Network Connections (SNCs) between any of the plurality of interconnected nodes;
wherein SONET and OTN bandwidth is segregated and paths are calculated separately by the signaling and routing protocol.

16. The optical network of claim 15, further comprising:
one or more databases associated with the signaling and routing protocol for maintaining topology and bandwidth of the network; and
path computation logic associated with the signaling and routing protocol to provide routes through the network based on the one or more databases.

17. The optical network of claim 16, wherein the path computation logic is configured to mesh restore SNCs responsive to failures or defects.

18. The optical network of claim 17, wherein the failures comprise any of OTUk-LOF, OTUk-AIS, OTUk-LOS, OTUk-BDI, OTUk-TIM, and equipment faults; and wherein the defects comprise any of ODUk-AIS, ODUk-BDI, ODUk-OCI, ODUk-LCK, OPVC-AIS, OPVC-BDI, OPVC-OCI, and OPVC-LCK.

19. The optical network of claim 16, wherein the plurality of interconnected nodes are configured to advertise bandwidth in terms of OTN, the advertised bandwidth comprises any of Optical Channel Data Unit n, where n=0, 1, 2, 3, and Optical channel Payload Virtual Containers.

20. A method of mesh restoration in an Optical Transport Network (OTN), comprising:
advertising bandwidth in terms of OTN;
establishing a Sub Network Connection (SNC) of OTN links using a signaling and routing protocol;
detecting a fault or defect affecting the SNC;
releasing the SNC; and
mesh restoring the SNC by recomputing a path in view of the fault or defect;
wherein dual instances of HELLO messages are operated in Synchronous Optical Network (SONET) overhead and OTN overhead; and
wherein SONET bandwidth and OTN bandwidth are managed separately from a path computation perspective.

* * * * *